United States Patent [19]

Schultz

[11] 3,856,446
[45] Dec. 24, 1974

[54] LEAD EXTRUSION DEVICE WITH MEANS FOR REMOVING A DIE MEMBER WITHOUT INACTIVATING THE MATERIAL FEED MEANS

[75] Inventor: John J. Schultz, Wilmington, Del.

[73] Assignee: Electric Hose & Rubber Company, Wilmington, Del.

[22] Filed: Mar. 20, 1973

[21] Appl. No.: 343,132

Related U.S. Application Data

[63] Continuation of Ser. No. 136,720, April 23, 1971, abandoned.

[52] U.S. Cl.................. 425/113, 425/192, 425/185
[51] Int. Cl............................................... B29f 3/10
[58] Field of Search .......... 425/190, 192, 466, 467, 425/381, 113, 191, 192, 185

[56] References Cited
UNITED STATES PATENTS

| | | |
|---|---|---|
| 2,511,986 | 6/1950 | Martin ................................ 425/113 |
| 2,928,123 | 3/1960 | Ramsey............................ 425/113 X |
| 3,299,474 | 1/1967 | Ashworth........................ 425/183 X |
| 3,538,547 | 11/1970 | Drabb................................. 425/113 |
| 3,581,343 | 6/1971 | Henrikson.......................... 425/192 |
| 3,690,796 | 9/1972 | Borsvold........................ 425/113 X |
| 3,752,614 | 8/1973 | Bremer............................... 425/113 |

Primary Examiner—Francis S. Husar
Assistant Examiner—David S. Safran
Attorney, Agent, or Firm—Connolly and Hutz

[57] ABSTRACT

An extrusion device for extruding a jacket along an elongated tube includes a die block through which the tube passes and a die assembly for forming the jacket. The die assembly is mounted in such a manner whereby it may be removed from the device without discontinuing feed of the jacket making material.

10 Claims, 9 Drawing Figures

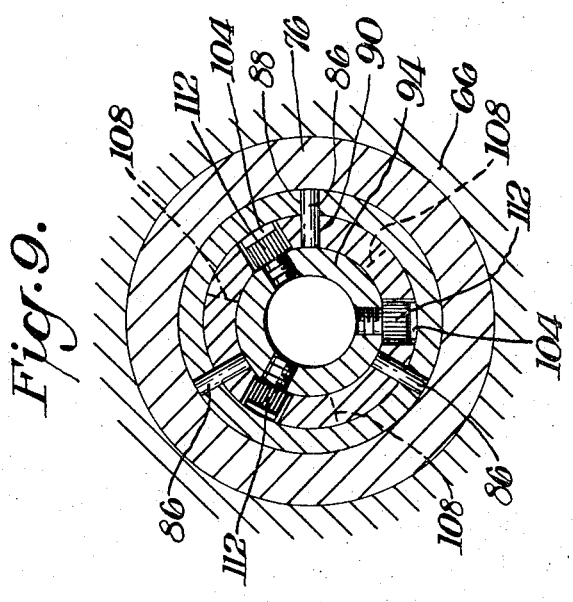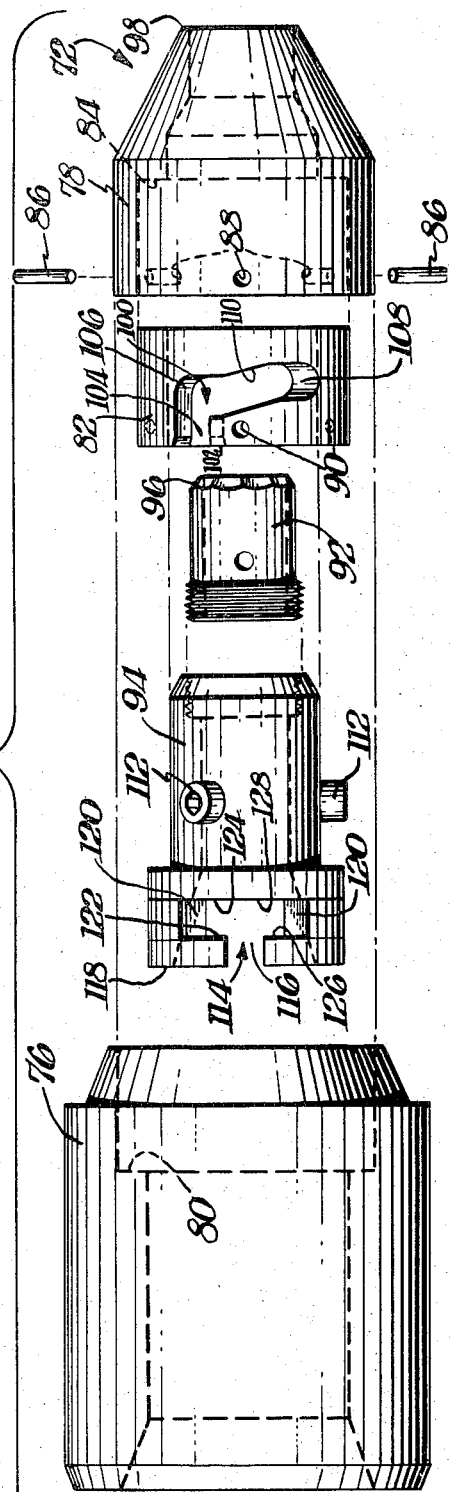

LEAD EXTRUSION DEVICE WITH MEANS FOR REMOVING A DIE MEMBER WITHOUT INACTIVATING THE MATERIAL FEED MEANS

CROSS-REFERENCE TO RELATED APPLICATION

This application is a continuation of application Ser. No. 136,720; filed Apr. 23, 1971, and now abandoned.

BACKGROUND OF INVENTION

This invention relates to an extrusion device, and more particularly to such an extrusion device which is specifically adapted for use in hose making. The art of making rubber hose has long existed. One conventional process is to extrude the rubber hose from an unvulcanized rubber material and then to extrude a hot lead jacket or pipe around the unvulcanized hose with the hose and lead jacket being disposed in a vulcanizer. In this respect water, air or any other suitable fluid may be charged into the hose under pressure with the hose and jacket then being placed in a steam vulcanizer. Hoses are also made with the use of a flexible mandrel and suitable vulcanizing techniques are employed. The lead jacket serves as an outer barrier for the hose while also imparting the desired outer configuration to the hose in accordance with the internal surface of the jacket. Thus, for example, if the inner surface of the lead jacket has a particular configuration this will determine the type of configuration produced on the outer surface of the hose. In this respect a projection on the inner surface of the lead surface will result in an indentation on the outer surface of the hose.

During such hose manufacture the need arises when it is necessary to change the jacket forming die. Such a die replacement might occur when it is desired to change the configuration of the hose or when it is desired to replace a dirty die. With conventional methods in order to replace a die it is necessary to not only stop the feed of the hose to the jacket extruder but also to discontinue feed of lead material. A single die change typically results in a downtime of about 60 to 75 minutes and such die changes might occur from two to four times a day. As can be appreciated the extensive downtime represents a significant disadvantage to conventional hose making processes. The long downtime resulting in these conventional processes is partially attributable to the necessity of substantially dismantling the jacket extruding device so as to provide access to the die. Additionally, a significant factor causing long downtime is the necessity for reheating the extruder when the extruding operation is to be restarted.

In view of the above disadvantages there is a need for an extrusion device which would permit ready replacement of the jacket forming die without the necessity of completely tearing apart the extrusion device or of discontinuing the feed of jacket making material. Such a device would be particularly useful in the hose making industry and might also be useful in other industries where a continuous jacket is formed about an elongated object.

SUMMARY OF INVENTION

An object of this invention is to provide a jacket extrusion device which overcomes the above disadvantages.

A further object of this invention is to provide such a jacket extrusion device which is particularly adaptable for forming lead jackets around an uncured rubber hose, as used in the rubber industry.

A yet further object of this invention is to provide an extrusion device wherein the dowmtime resulting from die replacement is of minimal duration.

In accordance with this invention an extrusion device for extruding a jacket along an elongated tube includes a die block through which the tube passes and a die assembly for forming the jacket. The die assembly is mounted in such a manner whereby it may be removed from the device without discontinuing feed of the jacket making material.

The jacket extrusion device may include die block having a longitudinal passageway with a male die assembly in the passageway through which the tube travels. A female die is disposed adjacent the male die assembly and is slightly spaced therefrom to permit the jacket forming material to be extruded along the tube. The male die assembly includes a master core insert and a die insert connected thereto. Movably mounted within the die insert is an extrusion die, while removal means are provided to permit the replacement of the extrusion die without inactivating the feeding of the jacket material to the extrusion device.

The removal means may include a die holder connected to the extrusion die for joint movement therewith. A locking sleeve may be disposed around the die holder and may have a camming surface which is engaged by a follower on the die holder to control the positioning of the extrusion die.

THE DRAWINGS

FIG. 3 is an exploded view of the male die assembly incorporated in the jacket extrusion device of FIG. 2;

FIG. 9 is a cross-sectional view taken through FIG. 7 along the line 9—9.

DETAILED DESCRIPTION

Figure 1:
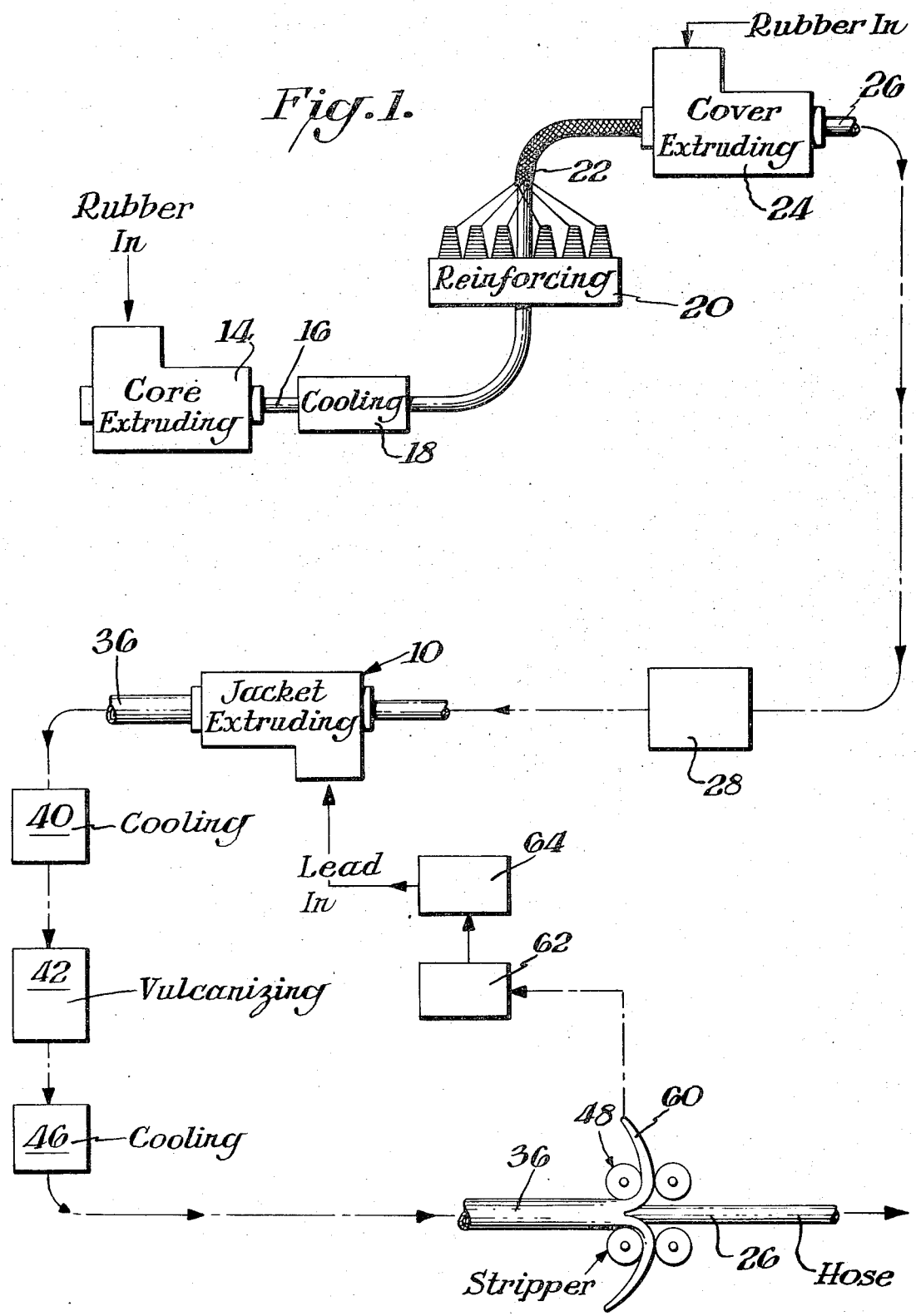
FIG. 1 is a schematic view showing the steps involved in a hose making operation which incorporates the novel jacket extruding device.

FIG. 1 is a schematic representation of a hose forming operation. As indicated therein uncured rubber is fed into extruder 14 to form an unvulcanized core 16 which is cooled at cooling station 18. Reinforcing material is applied at station 20 by braiding, spiraling, weaving or knitting strands 22 over core 16. The composite is then passed into a second extruder 24 for forming a cover made of unvulcanized rubber with the new composite 26 being cooled and stored at station 28. The composite 26 is then fed into the jacket extruding device 10 in accordance with this invention. At station 10 a hot lead jacket is extruded onto hose 26 and, for example, the jacketed hose 36 is wound on reels to facilitate its subsequent handling. Jacketed hose 36 is then cooled at station 40. The cooling may simply be air cooling. Next jacketed hose 36 is subjected to a vulcanizing step such as by charging the hose, air or other suitable fluid under pressure and placing the thusly charged hose in a steam vulcanizer at station 42. During vulcanization as a result of the hydraulic pressure on the inside of the hose the various components namely the core, the reinforcing material and cover are pushed against the lead jacket which forces the three components into one unit. At the same time the heat vulcanizes the rubber and converts it from a soft sticky substance to a tough durable substance. Because the hose is pressed against the lead pipe or jacket the internal configuration of the jacket dictates the outer surface of the finished hose. The vulcanized hose is then subjected to cooling operation at station 44 and next the lead jacket is removed by suitable strippers 48 and the vulcanized hose 26 is conveyed for later packaging and use. In the meantime the lead material 60 removed and chopped by strippers 48 is transported to storage station 62 from which the chopped material is then conveyed to heating station 64 to be melted and refed into extruder 10.

It is to be understood that the steps illustrated in FIG. 1 are merely exemplary of one use of this invention and are not intended to limit the invention thereby. For example the invention may be practiced in any process requiring the extrusion of a jacket-like element in a manner analogous to the process illustrated in FIG. 1. For example the hose may be made by use of a mandrel and various vulcanization techniques may be employed. In this respect it is possible to practice the invention in the manufacture of cables as well as hoses. Accordingly, as used hereinafter the term "hose" is meant to apply not only to hollow conventional type hoses but also to solid cable-like objects. Moreover the concepts of this invention may be employed in any arrangement wherein the internal configuration of a pipe-like element is of importance.

Figure 2:
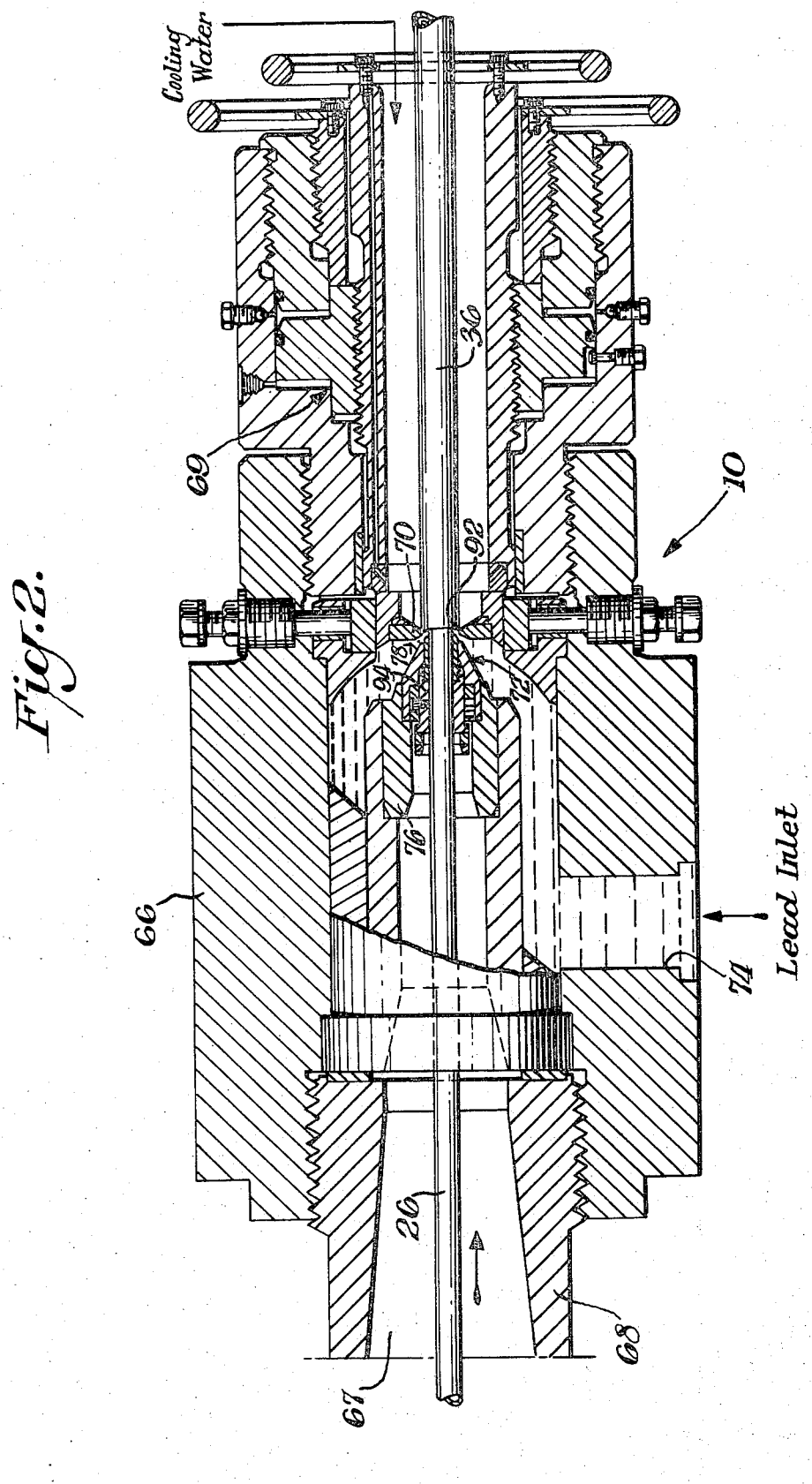
FIG. 2 is a cross-sectional view of the jacket extruding device shown in FIG. 1.
Figure 4:
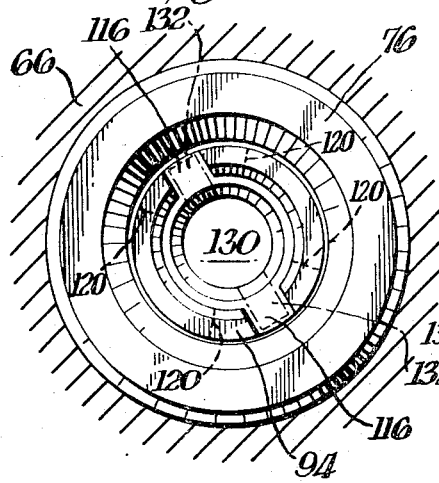
FIG. 4 is an end view of the male jacket assembly showing one phase of operation.

FIG. 2 shows various details of extruding device 10. As indicated therein device 10 includes a die block body 66 which has a longitudinal passageway extending completely therethrough consisting of a master core 68 and a hollow die locking and adjusting system 69. Within the body is a female die 70 disposed in passageway 168. Many aspects of device 10 are of conventional construction and include, for example, the necessary cooling means and also means for adjusting the positioning of die 70, as well as conventional deflector 71. Since these conventional aspects do not form a part of this invention the remaining description of device 10 will be directed to the novel features thereof.

As also illustrated in FIG. 2 within the master core passageway 67 is a male die assembly 72 whereby hot lead material is fed through inlet 74 and exits between male die assembly 72 and female die 70 to extrude lead jacket 36 on hose 26. The details of male die assembly 72 are better shown in FIGs. 3–9. As illustrated in FIG. 3, for example, male die assembly 72 includes a master core insert 76 and a die insert 78 which fits into recess 80 of master core insert 76. Similarly, a locking sleeve 82 fits in recess 84 of die insert 78 and is locked thereto by suitable pins 86 disposed in openings 88, 90. Master core insert 76, die insert 78 and locking sleeve 82 are essentially permanently mounted in passageway 67. Within these elements, however, is a movable assembly which includes extrusion die or tip 92 threadably engaged with die holder or tool locking member 94. Edge 96 of extrusion die 92 extends beyond the tip of die insert 78 to a position slightly spaced from female die 70 whereby the inner surface of jacket 36 is formed or extruded in accordance with the configuration of edge 96. As shown in FIG. 2, the rear edge of die holder 94 is disposed away from the open upstream end of the device by a distance substantially greater than the length of male die assembly 72.

During hose manufacturing a need arises for replacing die 92. In this respect the edge 96 may become dirty or otherwise damaged or contaminated which would affect the resultant configuration of the interior of jacket 36. Similarly, when a new configuration is desired for jacket 36 it is also necessary to replace die 92. With conventional jacket extruding devices in order to replace a die it is necessary to discontinue both the feeding of the hose and of the lead to the extrusion device so that access may be had to the die. Such access is had with conventional devices by completely tearing down or dismantling the device which would involve removing the die lock and both the female and male dies. After a die is replaced with conventional operations it is necessary to reheat the lead extruder so that the lead can again be extruded. As previously indicated this replacement process typically results in a downtime of about 60 to 75 minutes. With the inventive arrangement, however, all that is necessary for replacement of die 92 is to discontinue feeding the hose into the device and by a few simple manipulations the die can be removed from the rear of device 10 while still continuing to feed lead material over the edge 98 of insert 78. As shown in FIG. 2, the opening in female die 70 is at least substantially the same size as the opening in die insert 78 which is left when male die 92 is removed therefrom. A new die is then replaced and unvulcanized hose is again fed into extrusion device 10. The downtime between terminating the hose feed and its subsequent refeeding thereto is only about 5 minutes.

The remarkably decreased downtime is accomplished by providing camming means to control the positioning of die 92 and by providing easily accessible means to permit the die to be manipulated from the exposed rear of device 10 through passageway 67. In this respect sleeve 82 is provided with at least one and preferably three slots 100. As illustrated in FIG. 3 each slot 100 extends from the rear edge 102 of sleeve 82 in a longitudinally forward direction as indicated by the reference numeral 104, and then extends downwardly and forwardly from shoulder 106 to shoulder 108 as indicated by the reference numeral 110. A like number of pins 112 are provided on die holder 94 to act as followers in conjunction with the camming surfaces provided by slots 100. Advantageously, pins 112 are simply threaded fasteners which are secured into threaded openings into die holder 94 spaced 120° from each other. Die holder 94 also includes a T-shaped slot 112 wherein the base 116 of the T begins at the rear edge 118 of holder 94 and the arms 120 of the T thereby form stop shoulders 122, 124, 126, 218. Preferably a pair of diametrically opposite slots 114 are provided on die holder 94.

Figure 5:
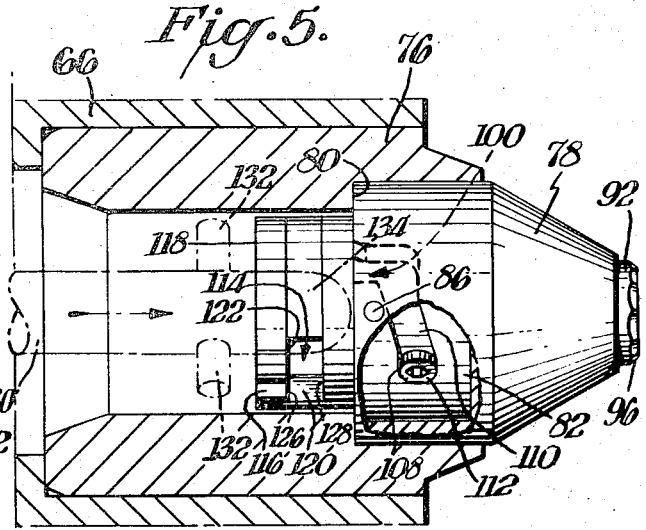
FIG. 5 is a cross-sectional view in elevation of the assembly shown in FIG. 4.
Figure 6:
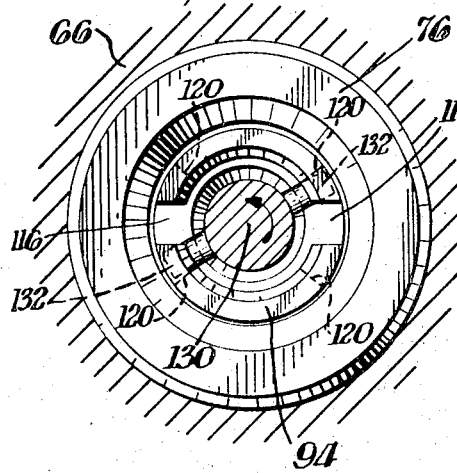
FIG. 6 is an end view similar to FIG. 4 in a different phase of operation.
Figure 7:
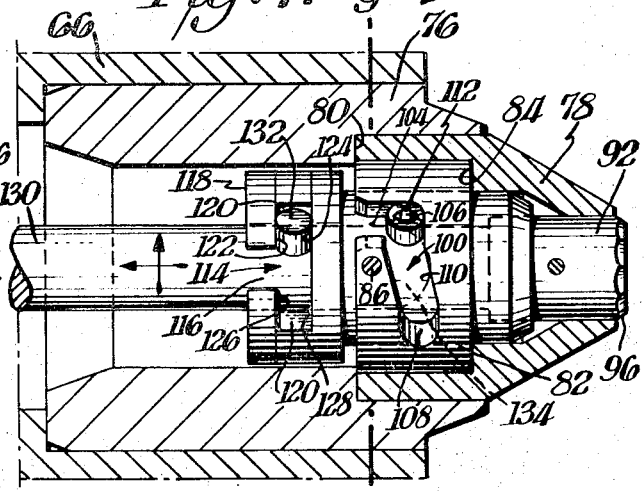
FIG. 7 is a cross-sectional view in elevation of the assembly shown in FIG. 6.
Figure 8:
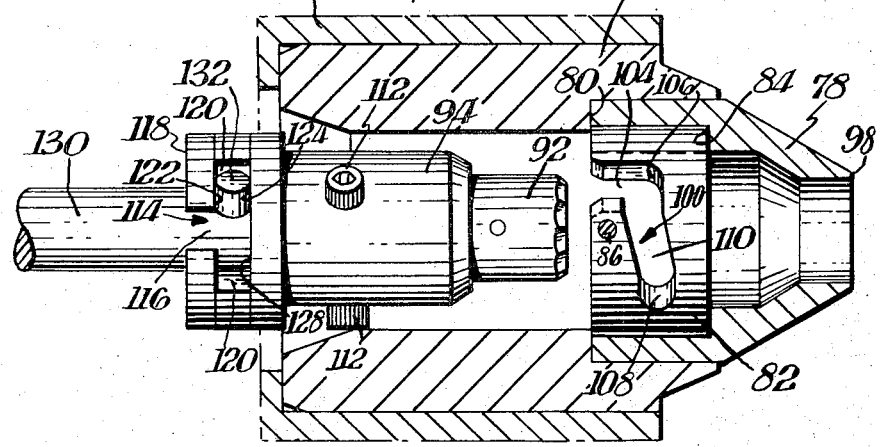
FIG. 8 is a cross-sectional view in elevation similar to FIGS. 5 and 7 showing a different phase of operation.

FIGS. 4–9 illustrate the simple manipulative steps required to replace die 92. As indicated therein a suitable tool such as rod 130 is provided with a pair of projections 132 thereon. As illustrated in FIG. 5 tool 130 is moved in a forward direction until the pins enter slot 114. Rounded tip 134 on tool 130 facilitates the proper positioning of tool 130 in the holder passageway. If a die is to be removed tool 130 is rotated upwardly or counterclockwise when viewed from the rear, so that the pins 132 are engaged between shoulders 122, 124. In this manner the tool 130 is coupleld for joint movement with the die holder and die assembly. When die 92 is in its proper position the follower pins 112 are at the lowermost portion of slots 100 adjacent shoulder 108. Tool 130 is then continued to be rotated counterclockwise which thereby causes follower pins 112 to ride up the camming surface provided by slot 110. During this rotational movement the various elements change from the position illustrated in FIG. 5 to that illustrated in FIG. 7 wherein die 92 has been moved in a rearward direction. The rotational movement is continued until pins 112 contact shoulders 106. At this point the pins are in the longitudinal portion 104 of slot 100. Tool 130 is then pulled longitudinally rearwardly whereby the entire assembly of the tool die holder and die are easily withdrawn from device 10.

To insert a new die the reverse procedure is followed. In this respect the old die is unscrewed from die holder 94 and a new die 92 is screwed thereon or a new holder and die assembly may be mounted on tool 130. The assembly of tool 130, die holder 82 and die 92 is inserted from the back of device 10 through passageway 67 until pins 112 enter slots 100. Tool 130 is then rotated clockwise until it becomes engaged between shoulders 126, 128. The rotational movement is continued whereby pins 112 ride through slots 110 which causes the die 92 to extend beyond the tip 98 of die insert 78.

During the interim while a die is being replaced in device 10 the hot lead continues to flow around the edge 98 of die insert 78 to, in effect, form a thickened tubular jacket. At this time, however, no hose is being fed through extrusion device 10. Accordingly, the inner configuration of the thusly formed tubeless jacket is of no particular consequence.

The concepts of this invention may be practiced in other ways than as specifically described. For example a threaded connection may be used between the locking sleeve and die holder instead of the cam and follower arrangement. A smooth continuous curve or a breach lock may be used instead of the offset slot 100. Moreover, instead of the T-shaped slot in the die holder, various mating parts which may be coupled together may be used for the tool and die holder.

As is readily apparent a novel extrusion device has been provided which is particularly adapted to use in the hose making industry wherein with very simple manipulations it is possible to replace the die while minimizing the downtime.

What is claimed is:

1. An extrusion device for extruding a jacket around an elongated tube comprising a die block body, a longitudinal passageway extending completely through said die block body, a female die in said passageway, a male die assembly in said passageway disposed adjacent said female die and slightly spaced therefrom, said male die assembly including a die insert facing said female die, an extrusion die tip removably engaged to said die insert and projecting therefrom disposed adjacent said female die, feed means for feeding jacket making material around said die insert and between said extrusion die tip and said female die whereby a tube may pass through said die block body and have a jacket extruded thereon, the downstream edge of said die insert being disposed sufficiently close to said female die to act as a male die when said die tip is removed therefrom, the opening in said female die being at least substantially the same size as the opening in said die insert left when said die tip is removed therefrom, said device having a longitudinal passage exposed at the upstream end of saidi device remote from said female die and of a size sufficient for said extrusion die tip to be movable therein, removal means for completely removing said extrusion die tip through said passage by manipulation externally of said device without inactivating said means for feeding said jacket making material and without interrupting the flow of material around said die insert, said removal means including a temporary tool locking member connected to said extrusion die tip for joint movement and for temporarily having a manipulating tool locked thereto, said tool locking member being wholly within said passage and terminating remote from the open upstream end of said device, said tool locking member having tool reception means at its rear edge remote from said open end of said device whereby said extrusion die tip may be manipulated externally of said device by insertion of a manipulating tool into said passage for engagement with said tool locking member to disengage said extrusion die tip from said die insert and to withdraw said extrusion die tip from said passage, and said tool locking member having means to hold it in place against axial movement within said passage when the manipulating tool is disengaged therefrom.

2. A device as set forth in claim 1 wherein said extrusion die tip and said tool locking member are of nonintegral two-piece construction.

3. A device as set forth in claim 2 wherein said feed means includes means for preparing the tube making material for use in the extrusion device.

4. A device as set forth in claim 1, wherein said means for preventing axial movement of said tool locking member includes a locking sleeve mounted in said die insert and around said extrusion die and said tool locking member.

5. A device as set forth in claim 1 including a locking sleeve mounted around said extrusion die and within said die insert for connection to said die insert, and said locking sleeve including positioning means for maintaining said extrusion die in proper positional relationship with respect to said die insert during operation of said device.

6. A device as set forth in claim 5 wherein said positioning means is also said means for holding said locking member against axial movement.

7. A device as set forth in claim 1 wherein said rear edge of said locking member is disposed away from said open upstream end by a distance substantially greater than the length of said male die assembly.

8. An extrusion device for extruding a pipe comprising a die block body, a passageway in said die block body, a female die in said passageway, a male die assembly in said passageway disposed adjacent said female die and slightly spaced therefrom, said male die assembly comprising a master core insert, a die insert connected to said core insert, an extrusion die movably mounted in said die insert and disposed adjacent said female die, feed means for feeding pipe making material between said extrusion die and said female die, removal means for removing said extrusion die from said die block body without inactivating said means for feeding said pipe making material, said passageway being longitudinal and extends completely through said body, said feed means including means for preparing the tube making material for use in the extrusion device, said removal means including manipulation means connected to said extrusion die whereby upon rotation of said manipulation means for insertion of said extrusion die results in simultaneous rotation and sliding movement of said extrusion die, said manipulation means comprising a die holder connected to said extrusion die for joint movement therewith, a locking sleeve mounted in said die insert and having camming means, and follower means on one of said die holder and extrusion die for riding against said camming means, said camming means comprises a slot in said locking sleeve, said slot extending from the rear edge of said sleeve longitudinally forward and then extending downwardly and forwardly, said follower means comprising at least one pin on said die holder for movement into said slot.

9. A device as set forth in claim 8 wherein said manipulating means includes a T-shaped slot in said locking sleeve with the base of the T being at the rear edge of said sleeve to permit a tool to enter said T-shaped slot and become locked to said sleeve for joint movement therewith.

10. An extrusion device for extruding a jacket around an elongated tube comprising a die block body, a longitudinal passageway extending completely through said die block body, a female die in said passageway, a male die assembly in said passageway disposed adjacent said female die and slightly spaced therefrom, said male die assembly including a die insert facing said female die, an extrusion die tip removably engaged to said die insert and projecting therefrom disposed adjacent said female die, feed means for feeding jacket making material around said die insert and between said extrusion die tip and said female die whereby a tube may pass through said die block body and have a jacket extruded thereon, said die block body having a longitudinal passage exposed at the upstream end of said device remote from said female die and of a size sufficient for said extrusion die tip to be movable therein, removal means for removing said extrusion die through said die block body passage by manipulating externally of said device without inactivating said means for feeding said jacket making material and without interrupting the flow of material around said die insert, and said removal means including temporary tool locking member connected to said extrusion die tip for joint movement and for temporarily having a manipulating tool locked thereto, said tool locking member being wholly within said passage and terminating remote from the open upstream end of said device, said tool locking member having tool reception means at its rear edge remote from said open end of said device whereby said extrusion die tip may be manipulated externally of said device by insertion of a manipulating tool into said passage for engagement with said tool locking member to disengage said extrusion die tip from said passage, said tool locking member having means to hold it in place against axial movement within said passage when the manipulating tool is disengaged therefrom, said means for preventing axial movement of said tool locking member including a locking sleeve mounted in said die insert and having camming means, and follower means on one of said locking tool member and extrusion die for riding against said camming means.

* * * * *

UNITED STATES PATENT OFFICE
CERTIFICATE OF CORRECTION

Patent No. 3,856,446    Dated December 24, 1974

Inventor(s)   JOHN J. SCHULTZ

It is certified that error appears in the above-identified patent and that said Letters Patent are hereby corrected as shown below:

Column 6, line 14, "saidi" should be --- said ---

Column 8, line 28, after "disengage" insert --- said extrusion die tip from said die insert and to withdraw ---

Signed and sealed this 22nd day of April 1975.

(SEAL)
Attest:

RUTH C. MASON
Attesting Officer

C. MARSHALL DANN
Commissioner of Patents
and Trademarks